(12) United States Patent
Glöckner et al.

(10) Patent No.: US 6,881,785 B2
(45) Date of Patent: Apr. 19, 2005

(54) DISPERSIONS OF AMORPHOUS UNSATURATED POLYESTER RESINS BASED ON PARTICULAR DICIDOL ISOMERS

(75) Inventors: Patrick Glöckner, Ratingen (DE); Martina Ortelt, Duelmen (DE); Werner Andrejewski, Dorsten (DE); Alessandro Cerri, Nottuln (DE); Lutz Mindach, Marl (DE); Stephan Kohlstruk, Duelmen (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/741,452

(22) Filed: Dec. 22, 2003

(65) Prior Publication Data

US 2004/0186226 A1 Sep. 23, 2004

(30) Foreign Application Priority Data

Dec. 24, 2002 (DE) .......................................... 102 61 006

(51) Int. Cl.$^7$ .............................. C08L 2/32; C08G 63/32
(52) U.S. Cl. .................. 524/801; 524/81; 524/115; 524/174; 524/442; 524/445; 524/449; 524/601; 524/604; 524/605; 528/296; 528/298; 528/300; 528/301; 528/302; 528/303; 528/304; 528/306; 528/308; 528/308.6; 528/176; 525/437; 525/444

(58) Field of Search ............................ 524/81, 115, 174, 524/442, 445, 449, 601, 604, 605, 801; 528/176, 296, 298, 300, 301, 302, 303, 304, 306, 307, 308, 308.6; 525/437, 444

(56) References Cited

U.S. PATENT DOCUMENTS

| 4,555,564 A | 11/1985 | Fischer et al. |
| 5,648,410 A | 7/1997 | Hille et al. |
| 6,143,841 A | 11/2000 | Spittka et al. |

FOREIGN PATENT DOCUMENTS

| DE | 924 889 | 3/1955 |
| DE | 953 117 | 11/1956 |
| DE | 2 245 110 A | 3/1974 |
| DE | 27 21 989 | 4/1979 |
| EP | 0 114 208 | 8/1984 |
| EP | 0 934 988 | 8/1999 |
| GB | 1046014 | 10/1966 |
| GB | 1163852 | 9/1969 |
| GB | 1 604 689 A | 12/1981 |

Primary Examiner—Samuel A. Acquah
(74) Attorney, Agent, or Firm—Oblon, Spivak, McClelland, Maier & Neustadt, P.C.

(57) ABSTRACT

An aqueous dispersion based on an amorphous unsaturated polyester resin obtained by polycondensing a mixture of Dicidol isomers and one or more saturated and/or unsaturated dicarboxylic acids.

32 Claims, No Drawings

DISPERSIONS OF AMORPHOUS UNSATURATED POLYESTER RESINS BASED ON PARTICULAR DICIDOL ISOMERS

SUMMARY OF THE INVENTION

1. Field of the Invention

The invention relates to dispersions of amorphous unsaturated polyester resins based on particular Dicidol isomers and acids.

2. Discussion of the Background

Unsaturated polyester resins (UP resins) are known. They may be prepared by condensing saturated and unsaturated dicarboxylic acids or their anhydrides with diols. Their properties depend largely on the nature and proportion of the starting materials.

Conventionally, $\alpha,\beta$-unsaturated acids, primarily maleic acid or an anhydride thereof, or fumaric acid, are used as the source of polymerizable double bonds. Unsaturated diols are of minor importance for providing polymerizable double bonds. The higher the double bond content, the shorter the distance between the double bonds in the chain molecules and the more reactive the polyester resin. Polyester resin of high double-bond content may polymerize rapidly, evolving large quantities of heat and under-going a high level of volume contraction to form a highly crosslinked and therefore relatively brittle end product. Consequently the reactive double bonds in the polyester molecule are "diluted" by cocondensing saturated aliphatic or aromatic dicarboxylic acids together with unsaturated diols. Straight-chain and branched diols may be used as alcohol components. UP resin types differ not only in the components used to prepare them but also in the proportion of saturated to unsaturated acids, which my affect the degree of crosslinking in the polymerization, the degree of condensation, i.e., the molar mass, the acid number and OH number, i.e., the nature of the end groups in the chain molecules, the monomer content, and the nature of the additions (Ullmann's Encyclopedia of Industrial Chemistry, Vol. A21, p. 217 ff, 1992).

UP resins based on Dicidol as the diol component are known from, for example, DE 924 889, DE 953 117, DE 22 45 110, DE 27 21 989, EP 0 114 208, and EP 0 934 988.

It is an object of the present invention to prepare new, urethanized, unsaturated, and amorphous polyester resins which additionally may be water-dispersible and transparent solid in the solid form and dispersions thereof.

DETAILED DESCRIPTION OF THE INVENTION

Accordingly, it is an object of the present invention to provide aqueous dispersions of amorphous unsaturated polyester resins, synthesized from (i) an alcohol component, (ii) from 20 to 95 mol % of an $\alpha,\beta$-unsaturated carboxylic acid component and from 0 to 75 mol % of a further carboxylic acid component, (iii) from 5 to 40 mol % of trimellitic acid (or an anhydride thereof), wherein the alcohol component is composed of a Dicidol mixture of the isomeric compounds 3,8-bis(hydroxymethyl)-tricyclo[$5.2.1.0^{2,6}$]decane, 4,8-bis(hydroxymethyl)-tricyclo[$5.2.1.0^{2,6}$]decane and 5,8-bis(hydroxymethyl)tricyclo[$5.2.1.0^{2,6}$]decane, it being possible for each isomer to be present in a fraction of from 20 to 40 mol % of the Dicidol mixture, and the sum of the three isomers being from 90 to 100 mol % of the Dicidol mixture, and the Dicidol mixture is from 10 to 100 mol % of the alcohol component of the polyester.

The aqueous dispersions have a) a nonvolatiles content of from 20% to 60% by weight, b) a solvent content of from 0 to 60% by weight, c) a pH of between 5.0 and 9.5, and d) a viscosity at 20° C. of from 20 to 500 mPas.

All values and subranges between the stated ranges are included. For example, the values 1, 2, 5, 10, 11, 12, 15 are included in the range 0–20.

The dispersions of one embodiment of the amorphous unsaturated polyester resins are obtained by polycondensing the alcohol and the acid components and then dispersing the resulting product in water after neutralization. Other components may simultaneously be condensed with the alcohol and acid components or the resins may consist of only the acid and alcohol components.

The alcohol component may comprise a Dicidol mixture of the isomeric compounds 3,8-bis(hydroxymethyl)tricyclo[$5.2.1.0^{2,6}$]-decane, 4,8-bis(hydroxymethyl)tricyclo[$5.2.1.0^{2,6}$]decane and 5,8-bis(hydroxymethyl)tricyclo[$5.2.1.0^{2,6}$]decane, it being possible for each isomer to be present in a fraction of from 20 to 40 mol % in the mixture and the sum of the three isomers may be from 90 to 100 mol %, preferably from 95 to 100% of the Dicidol mixture, and the mixture is at least at 10% by weight of the alcohol component of the polyester. The isomer content of the Dicidol mixture can be determined qualitatively and quantitatively, for example by GC analysis or quantitatively by fractionation, and/or by preparative GC or HPLC and subsequent NMR spectroscopy. All corresponding isomers of Dicidol in position 9 are equally suitable. Owing to the mirror symmetry of the above-mentioned isomers and the cis and trans isomers, it may not be possible to distinguish each compound using conventional analytical techniques. The Dicidol mixture may also contain up to 10 mol % of further isomers of Dicidol and/or trimeric and/or higher isomeric diols of the Diels-Alder reaction product of a diol of cyclopentadiene. The alcohol component is preferably at least 20 mol %, or more preferably of 30%, even more preferably of 60%, with particular preference 100% of Dicidol mixture. With particular preference the alcohol component contains from 95 to 100% of the three isomeric compounds stated above.

The alcohol component should not contain more than 90% by weight of further linear and/or branched, aliphatic and/or cycloaliphatic and/or aromatic diols and/or polyols besides the Dicidol mixture. Preferred additional alcohols that may be used include ethylene glycol, 1,2- and/or 1,3-propanediol, diethylene glycol, dipropylene glycol, triethylene glycol, tetraethylene glycol, 1,2- and/or 1,4-butanediol, 1,3-butylethylpropanediol, 1,3-methylpropanediol, 1,5-pentanediol, bisphenol A, B, C or F, norbornylene glycol, 1,4-benzyldimethanol and -ethanol, 2,4-dimethyl-2-ethylhexane-1,3-diol, cyclohexanedimethanol, glycerol, hexanediol, neopentyl glycol, trimethylolethane, trimethylolpropane and/or pentaerythritol.

The amorphous unsaturated polyester resins of the invention contain as starting acid component II at least from 20 to 95 mol %, preferably from 30 to 90 mol %, more preferably from 35 to 85 mol % of one or more α,β-unsaturated dicarboxylic acids. Preference is given to using citraconic, fumaric, itaconic, maleic and/or mesaconic acid. Especial preference is given to using fumaric and/or maleic acid (anhydride). Mixtures of one or more of these acids with or without other acids may be used. The acid component may consist of a single acid or more than one acid excluding other acid compounds not stated above.

It is also possible in addition for aromatic and/or aliphatic and/or cycloaliphatic monocarboxylic acids and/or dicarboxylic acids and/or polycarboxylic acids to be present in amounts of up to 75 mol %, preferably up to 60 mol %, more preferably up to 50 mol %, examples include phthalic acid, isophthalic acid, terephthalic acid, 1,4-cyclohexanedicarboxylic acid, succinic acid, sebacic acid, methyltetrahydrophthalic acid, methyl-hexahydrophthalic acid, hexahydrophthalic acid, tetra-hydrophthalic acid, dodecanedioic acid, adipic acid, azelaic acid, pyromellitic acid, isononanoic acid, and 2-ethylhexanoic acid. Phthalic acid, hexahydrophthalic acid, tetrahydrophthalic acid, hexahydroterephthalic acid, adipic acid and/or azelaic acid are preferred.

Also present is from 5 to 40 mol %, preferably from 10 to 35 mol %, more preferably from 15 to 30 mol % of trimellitic acid (anhydride) as component III.

The acid component may be composed in whole or in part of anhydrides and/or low molecular mass alkyl esters thereof, preferably methyl esters and/or ethyl esters.

Generally speaking the alcohol component is present at a molar ratio of from 0.5 to 2.0:1 with respect to the acid component II, preferably from 0.8 to 1.5:1. With particular preference the reaction of the alcohol component takes place in a molar ratio of from 1.0 to 1.3:1 with respect to the acid component II.

The unsaturated amorphous polyester resins of the invention have an acid number of between 1 and 200 mg KOH/g, preferably between 1 and 100, more preferably between 10 and 50 mg KOH/g, and an OH number of between 1 and 200 mg KOH/g, preferably between 1 and 100, more preferably between 10 and 80 mg KOH/g.

The Tg (glass transition temperature) of the unsaturated amorphous polyesters of the invention may be from −30 to +80° C., preferably from −20 to +50° C., more preferably from −10 to +40° C.

In one preferred embodiment, the amorphous unsaturated polyester resins of the invention are composed of an alcohol component containing at least 80%, preferably 90%, more preferably 95%, even more preferably 100% of the Dicidol mixture of the isomeric compounds 3,8-bis-(hydroxymethyl)tricyclo[$5.2.1.0^{2,6}$]decane, 4,8-bis-(hydroxymethyl)tricyclo[$5.2.1.0^{2,6}$]decane and 5,8-bis-(hydroxymethyl)tricyclo[$5.2.1.0^{2,6}$]decane and of fumaric acid and/or maleic acid (anhydride) and trimellitic acid (anhydride).

In another preferred embodiment, the polyester resins comprise the starting components of the preferred embodiment and additionally a further acid component (ii) selected from adipic acid or phthalic acid (or an anhydride thereof), it being possible for the ratio of the α,β-unsaturated acid to the additional acid to vary from 3:1 to 1:4. Preference is given to ratios of approximately from 1:1 to 1:2. The polyesters generally have acid numbers of from 1 to 200, preferably from 1 to 100, more preferably from 10 to 50 mg KOH/g and OH numbers of from 1 to 200, preferably from 1 to 100, more preferably from 10 to 80 mg KOH/g.

The dispersions of amorphous unsaturated polyester resins, in an embodiment of the invention, can also comprise auxiliaries and additives selected from inhibitors, solvents, neutralizing agents, surfactants, oxygen scavengers and/or free-radical scavengers, catalysts, light stabilizers, color brighteners, photosensitizers, thixotropic agents, antiskinning agents, defoamers, antistats, thickeners, thermoplastic additives, dyes, pigments, flame retardants, internal release agents, fillers and/or blowing agents.

The invention also provides a process for preparing aqueous dispersions of amorphous unsaturated polyester resins synthesized from
(i) an alcohol component,
(ii) from 20 to 95 mol % of an α,β-unsaturated carboxylic acid component and
from 0 to 75 mol % of a further carboxylic acid component,
(iii). from 5 to 40 mol % of trimellitic acid (or anhydride) thereof,
wherein the alcohol component is a Dicidol mixture of the isomeric compounds 3,8-bis(hydroxymethyl)-tricyclo [$5.2.1.0^{2,6}$]decane, 4,8-bis(hydroxymethyl)-tricyclo [$5.2.1.0^{2,6}$]decane and 5,8-bis(hydroxymethyl)-tricyclo [$5.2.1.0^{2,6}$]decane, it being possible for each isomer to be present in a fraction of from 20 to 40% in the mixture, and the sum of the three isomers being from 90 to 100%, and the mixture is from 10 to 100 mol % of the alcohol component of the polyester, The dispersions have
a) a nonvolatiles content of from 20% to 60% by weight,
b) a solvent content of from 0 to 60% by weight,
c) a pH of between 5.0 and 9.5, and
d) a viscosity at 20° C. of from 20 to 500 mPas.

The aqueous dispersion may be formed by reacting starting components (i) and (ii) and then reacting the product with component (iii), at a temperature of from 150 to 270° C., and dispersing the resultant polyester resin, following neutralization, into the aqueous phase.

The polyester resins of the invention may be prepared by (semi)continuous or batchwise esterification of the starting acids II and starting alcohols I and subsequent reaction of their product with component III in a single-stage or multistage procedure, neutralization, and subsequent dispersion.

The reaction of I, II, and III for the preparation of the unsaturated amorphous polyesters, as described above, is conducted preferably in an inert gas atmosphere at from 150 to 270° C., more preferably from 160 to 230° C, very preferably from 160 to 210° C. Nitrogen or noble gases, especially nitrogen, can be used as inert gas. The inert gas has an oxygen content of less than 50 ppm, in particular less than 20 ppm.

The polyester resins of the invention may be fully or partly neutralized with a suitable neutralizing agent, such as an amine, for example, or an inorganic hydroxide solution, preference being given to ammonia, dimethylethanolamine, triethylamine and/or NaOH. The degree of neutralization is between 0.3 and 1.2, preferably between 0.4 and 1.1, more preferably between 0.6 and 1.05, and the product is a water-dilutable, amorphous, unsaturated polyester. This polyester, is dispersed in water with the use where appropriate of up to 60% by weight of a suitable auxiliary solvent. Suitable auxiliary solvents used are low-boiling inert solvents which have no miscibility gap with water, at least over wide ranges, which possess a boiling point under atmospheric pressure of below 100° C. and which can therefore easily be separated off, if desired, by distillation down to a residual level of less than 2% by weight, and in particular of less than 0.5% by weight, based on the finished dispersion, and can be used again. Examples of suitable solvents of this kind include acetone, methyl ethyl ketone, and tetrahydrofuran. Also suitable in principle are higher-boiling solvents such as n-butyl glycol, di-n-butyl glycol, and N-methylpyrrolidone, for example, which then remain in the water-dilutable dispersion. Depending on the intended use of the dispersion, the auxiliary solvent used can be removed finally by distillation from the resulting dispersion.

The subject matter of the invention is illustrated below with reference to examples which are not intended to further limit the claimed invention.

EXAMPLES

Starting component Dicidol mixture (claim 1) in an approximately 1:1:1 isomer ratio

Example Polyester 1

2.2 mol of adipic acid were reacted with 6.8 mol of Dicidol at 210° C. under a nitrogen atmosphere until an acid number of less than 5 mg KOH/g was reached. Then 2.2 mol of fumaric acid and 0.04% of hydroquinone monomethyl ether were added. After 2 hours of stirring a vacuum of 20 mbar was applied until an acid number below 5 mg KOH/g was reached. 150 g of trimellitic anhydride were added to 1300 g of the polyester prepared and the mixture was stirred at 200° C. for 1.5 hours until an acid number of approximately 30 mg KOH/g was reached. Characteristics:

$M_n$: 2500 g/mol, $M_w$: 12 000 g/mol, acid number: 31 mg KOH/g, hydroxyl number: 66 mg KOH/g, Tg: 35° C.

Example Polyester 2

4.44 mol of Dicidol, 4.30 mol of hexanediol, and 3.3 mol of adipic acid were stirred at 210° C. under a nitrogen atmosphere until the acid number was approximately 5 mg KOH/g. Then 3.3 mol of maleic anhydride and 0.1% of hydroquinone were added and the mixture was held until an acid number of below 1 mg KOH/g was obtained, with a vacuum of 20 mbar being applied in the end phase, of the condensation. Then 0.5 mol of trimellitic anhydride was added and the mixture was held until the acid number was approximately 30 mg KOH/g.
Characteristics:

$M_n$: 2000 g/mol, acid number: 27 mg KOH/g, hydroxyl number: 55 mg KOH/g, Tg: −9° C.

Example—Preparation of an Aqueous Dispersion

The polyester of example 1 was dissolved in acetone to give a 50% strength solution. Then DMEA (dimethylethanolamine) was added (degree of neutralization: 1.0). Following the addition of water the acetone was removed by distillation. This gives a storage-stable dispersion with a solids content of approximately 36%.
Characteristics:

acid number: 27 mg KOH/g, viscosity$_{D=200}$: 180 mPas, pH: 7.8, solids content: 36.0%

Example—Preparation of an Aqueous Dispersion II

The polyester of example 2 was dissolved in acetone to give a 60% strength solution. Then DMEA was added (degree of neutralization: 0.7). Following the addition of water the acetone was removed by distillation. This gives a storage-stable dispersion with a solids content of approximately 37%.
Characteristics:

acid number: 25 mg KOH/g, viscosity$_{D=200}$: 155 mPas, pH: 7.5, solids content: 37.5%

Example—Preparation of an Aqueous Dispersion III

The polyester of example 2 was melted at approximately 120° C. in a closed vessel, admixed with DMEA in accordance with a degree of neutralization of 1.0, and water was added with vigorous stirring. On cooling to room temperature, a storage-stable dispersion was obtained which has a solids content of approximately 38%.
Characteristics:

acid number: 27 mg KOH/g, viscosity$_{D=200}$: 85 mPas, pH: 7.7, solids content: 38.5%.

German application no. 102061006.1, filed on Dec. 24, 2002, was incorporated by reference herein in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. An aqueous dispersion comprising water and an amorphous unsaturated polyester resin, wherein the amorphous unsaturated polyester resin comprises bonded units of
   (i) an alcohol component,
   (ii) from 20 to 95 mol % of an α,β-unsaturated carboxylic acid component, and from 0 to 75 mol % of a further carboxylic acid component, and
   (iii) from 5 to 40 mol % of trimellitic acid or anhydride of trimellitic acid,
   wherein the alcohol component comprises from 10 to 100 mol % of a Dicidol mixture comprising the isomeric compounds
   3,8-bis(hydroxymethyl)tricyclo[5.2.1.0$^{2,6}$]decane,
   4,8-bis(hydroxymethyl)tricyclo[5.2.1.0$^{2,6}$]decane, and
   5,8-bis(hydroxymethyl)tricyclo[5.2.1.0$^{2,6}$]decane,
   wherein each isomer is present in a fraction of from 20 to 40 mol % based on the total amount of the Dicidol mixture, and the sum of the three isomers is from 90 to 100 mol % of the Dicidol mixture, and
   wherein the aqueous dispersion has
   a) a nonvolatiles content of from 20% to 60% by weight,
   b) a solvent content of from 0 to 60% by weight,
   c) a pH of between 5.0 and 9.5, and
   d) a viscosity at 20° C. of from 20 to 500 mPas.

2. The aqueous dispersion as claimed in claim 1, wherein the alcohol component further comprises up to 10% of one or more of another isomer of Dicidol, a trimeric diol, or a higher isomeric diol of the Diels-Alder reaction product of a diol of cyclopentadiene.

3. The aqueous dispersion as claimed in claim 1, wherein the alcohol component comprises at least 20 mol % of the Dicidol mixture.

4. The aqueous dispersion as claimed in claim 1, wherein the alcohol component comprises at least 30 mol % of the Dicidol mixture.

5. The aqueous dispersion as claimed in claim 1, wherein the alcohol component comprises at least 60 mol % of the Dicidol mixture.

6. The aqueous dispersion as claimed in claim 1, wherein the alcohol component is 100 mol % of the Dicidol mixture.

7. The aqueous dispersion as claimed in claim 1, wherein the amorphous unsaturated polyester resin comprises not more than 80 mol % of bonded units of other linear diols, branched diols, aliphatic diols, cycloaliphatic diols, aromatic diols, and polyols.

8. The aqueous dispersion as claimed in claim 1, wherein the amorphous unsaturated polyester resin comprises bonded units of at least one selected from the group consisting of ethylene glycol, 1,2-propane-diol, 1,3-propane-diol, diethylene glycol, dipropylene glycol, triethylene glycol, tetraethylene glycol, 1,2-1,4-butanediol, 1,4-butanediol, 1,3-butylethylpropanediol, 1,3-methylpropanediol, 1,5-pentanediol, cyclohexanedimethanol, glycerol, hexanediol, neopentylglycol, trimethylolethane, trimethylolpropane, pentaerythritol, bisphenol A, bisphenol B, bisphenol C, bisphenol F, norbornylene glycol, 1,4-benzyldimethanol, 1,4-benzyldi-ethanol, and 2,4-dimethyl-2-ethylhexane-1,3-diol.

9. The aqueous dispersion as claimed in claim 1, wherein the amorphous unsaturated polyester resin comprises bonded units of one or more of citraconic acid, fumaric acid, itaconic acid, maleic acid or mesaconic acid.

10. The aqueous dispersion as claimed in claim 1, wherein the amorphous unsaturated polyester resin comprises bonded units of one or more of fumaric acid, maleic acid or an anhydride thereof.

11. The aqueous dispersion as claimed claim 1, wherein the amorphous unsaturated polyester resin comprises bonded units of one or more aromatic monocarboxylic acids, aromatic dicarboxylic acids, aromatic polycarboxylic acids, aliphatic monocarboxylic acids, aliphatic dicarboxylic acids, aliphatic polycarboxylic acids, cycloaliphatic monocarboxylic acids, cycloaliphatic dicarboxylic acids, or cycloaliphatic polycarboxylic acids.

12. The aqueous dispersion as claimed in claim 11, wherein the amorphous unsaturated polyester resin further comprises bonded units of at least one of phthalic acid, isophthalic acid, terephthalic acid, 1,4-cyclohexanedicarboxylic acid, succinic acid, sebacic acid, methyltetrahydrophthalic acid, methylhexahydrophthalic acid, hexahydrophthalic acid, tetrahydrophthalic acid, dodecanedioic acid, adipic acid, azelaic acid, pyromellitic acid, isononanoic acid, 2-ethylhexanoic acid, an anhydride thereof, or a methyl ester thereof.

13. The aqueous dispersion as claimed in claim 12, wherein the amorphous unsaturated polyester resin further comprises bonded units of one or more of adipic acid, phthalic acid or an anhydride thereof.

14. The aqueous dispersion as claimed in claim 1, wherein at least a portion of the acid component (ii) is present as an anhydride, an alkyl ester or both an anhydride and an alkyl ester.

15. The aqueous dispersion as claimed in claim 1, wherein the molar ratio of the alcohol component to the acid component (ii) is from 0.5:1 to 2.0:1.

16. The aqueous dispersion as claimed in claim 1, wherein the molar ratio of the alcohol component to the acid component (ii) is from 0.8:1 to 1.5:1.

17. The aqueous dispersion as claimed in claim 1, wherein the molar ratio of the alcohol component to the acid component (ii) is from 1.0:1 to 1.3:1.

18. The aqueous dispersion as claimed in claim 1, wherein the amorphous unsaturated polyester resin has an acid number of between 1 and 200 mg KOH/g.

19. The aqueous dispersion as claimed in claim 1, wherein the amorphous unsaturated polyester resin has an OH number of between 1 and 200 mg KOH/g.

20. The aqueous dispersion as claimed in claim 1, further comprising one or more auxiliaries or additives.

21. The aqueous dispersion as claimed in claim 1, further comprising one or more auxiliary or additives selected from the group consisting of an inhibitor, a neutralizing agent, a surfactant, an oxygen scavenger, a free-radical scavenger, a catalyst, a light stabilizer, a color brightener, a photosensitizer, a thixotropic agent, an antiskinning agent, a defoamer, an antistat, a thickener, a thermoplastic additive, a dye, a pigment, a flame retardant, an internal release agent, a filler and a blowing agent.

22. The aqueous dispersion as claimed in claim 1, wherein at least 80% of the alcohol component is the Dicidol mixture, and at least one of fumaric acid, maleic acid, or an anhydride thereof is present as bonded units in the amorphous unsaturated polyester resin.

23. The aqueous dispersion as claimed in claim 1, wherein the amorphous unsaturated polyester resin further comprises additional bonded units of one or more of adipic acid, phthalic acid, or an anhydride thereof, in a ratio of α,β-unsaturated acid to additional units of from 3:1 to 1:4.

24. The aqueous dispersion as claimed in claim 1, wherein at least a portion of the acid groups of the unsaturated amorphous polyester resin have been neutralized.

25. The aqueous dispersion as claimed in claim 1, wherein the aqueous dispersion is neutralized with an amine, an inorganic hydroxide solution or both an amine and an inorganic hydroxide solution.

26. The aqueous dispersion as claimed in claim 1, having a degree of neutralization of between 0.3 and 1.2.

27. A process for preparing an aqueous dispersion of an amorphous unsaturated polyester resin comprising bonded units of
(i) an alcohol component,
(ii) from 20 to 95 mol % of an α,β-unsaturated carboxylic acid component, and from 0 to 75 mol % of a further carboxylic acid component, and
(iii) from 5 to 40 mol % of trimellitic acid or anhydride of trimellitic acid,
wherein the alcohol component comprises from 10 to 100 mol % of a Dicidol mixture comprising the isomeric compounds
3,8-bis(hydroxymethyl)tricyclo[$5.2.1.0^{2,6}$]decane,
4,8-bis(hydroxymethyl)tricyclo[$5.2.1.0^{2,6}$]decane, and
5,8-bis(hydroxymethyl)tricyclo[$5.2.1.0^{2,6}$]decane,
wherein each isomer is present in a fraction of from 20 to 40 mol % based on the total amount of the Dicidol mixture, and the sum of the three isomers is from 90 to 100 mol % of the Dicidol mixture, and
wherein the aqueous dispersion has
a) a nonvolatiles content of from 20% to 60% by weight,
b) a solvent content of from 0 to 60% by weight,
c) a pH of between 5.0 and 9.5, and
d) a viscosity at 20° C. of from 20 to 500 mPas,
said process comprising,
reacting components (i) and (ii) to obtain a reaction product, then
reacting the reaction product with component (iii) at a temperature of from 150 to 270° C. to form a polyester resin,
neutralizing, and
dispersing the polyester resin in water.

28. The process as claimed in claim 27, wherein reacting is carried out at a temperature of from 160 to 230° C.

29. The process as claimed in claim 27, wherein the reaction is carried out in an inert gas atmosphere.

30. The process as claimed in claim 29, wherein the inert gas has an oxygen content of less than 50 ppm.

31. The process as claimed in claim 27, wherein the amorphous unsaturated polyester resin is dispersed in water in the presence of an organic auxiliary solvent.

32. The process as claimed in claim 31, further comprising
removing the organic auxiliary solvent by distillation.

* * * * *